Aug. 12, 1958  J. H. CASTERLIN  2,846,891
GYROSCOPIC APPARATUS

Filed May 24, 1957  3 Sheets-Sheet 1

INVENTOR
JAMES H. CASTERLIN
BY
ATTORNEYS

Aug. 12, 1958     J. H. CASTERLIN     2,846,891
GYROSCOPIC APPARATUS

Filed May 24, 1957     3 Sheets-Sheet 2

*INVENTOR.*
JAMES H. CASTERLIN
BY

ATTORNEYS

Aug. 12, 1958     J. H. CASTERLIN     2,846,891
GYROSCOPIC APPARATUS

Filed May 24, 1957     3 Sheets-Sheet 3

INVENTOR.
JAMES H. CASTERLIN.
BY
ATTORNEYS

United States Patent Office 2,846,891
Patented Aug. 12, 1958

2,846,891

GYROSCOPIC APPARATUS

James H. Casterlin, Binghamton, N. Y., assignor to General Aniline & Film Corporation, New York, N. Y., a corporation of Delaware Application May 24, 1957, Serial No. 661,448

3 Claims. (Cl. 74—5.47)

This invention relates to improvements in gyroscopic apparatus and more particularly to gyroscopes having three degrees of freedom combined with sensing means for actuating remote devices.

A gyroscope having three degrees of freedom, represented, for example, by the gyro vertical or the directional gyroscope, usually includes, as is well known in the art, a gimbal ring in which the rotor bearing member or casing is mounted about an inner or minor axis at right angles to the spinning axis of the gyro rotor, while the gimbal ring is mounted for movement about a major or outer axis at right angles to the inner or minor axis. Where electrical apparatus, such as a relay, is to be actuated in response to movement of the gyroscope about the inner or minor axis, a problem is presented as to how to actuate the relay from the gyroscope proper without exerting a reaction of the same and without unduly loading the delicate moving parts.

It is an object of this invention to provide simple and reliable electrical contactors in combination with a gyroscope for closing electrical circuits which may be associated with remotely controlled devices.

It is a particular feature of the invention that the electrical contact elements are so constructed as to present a minimum load upon parts of the gyroscope, the displacement of which is to be sensed.

It is an other feature of the invention that the contact elements herein provided may easily be attached to conventional gyroscopes, means also being provided for a follow-up movement of such contact elements.

Other objects and features will be apparent from the following description of the invention, pointed out in particularity in the appended claims, and taken in connection with the accompanying drawings, in which:

The present invention is chiefly concerned with the arrangement of electrical contacts to be actuated by displaceable portions of a gyroscope as, for example, a gyro vertical or directional gyroscope used in aircraft. Accordingly, only such portions of the gyroscope which carry the contact elements are shown in detail. Parts which have no direct connection with the operation of the motion sensing electrical contacts are represented only by way of example, thus need not be fully illustrated.

Figure 1:
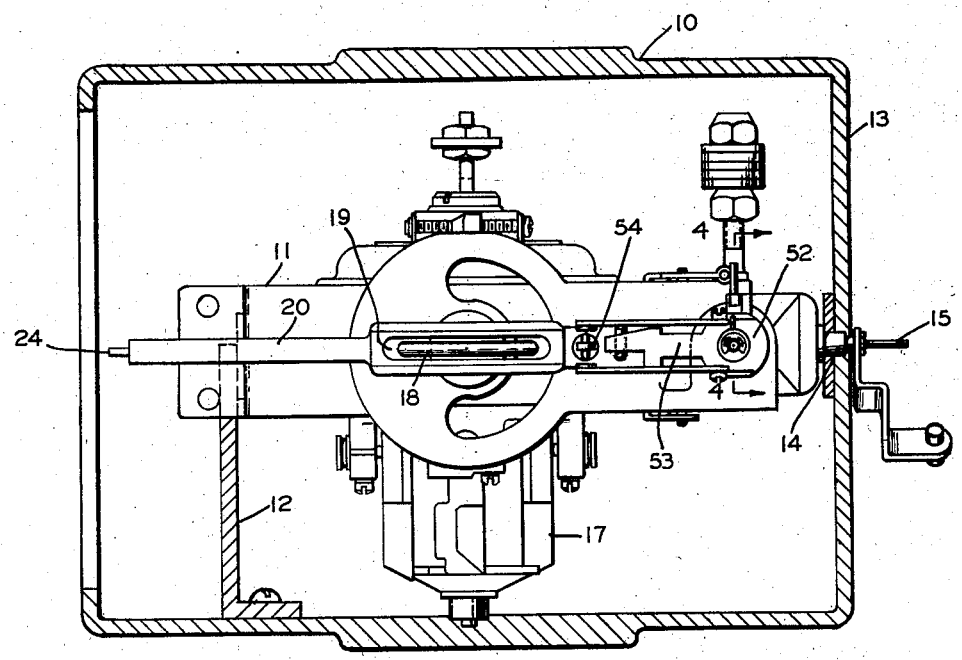
Fig. 1 is a side elevational view of the major portions of a gyroscope within a housing, partially shown.
Figure 2:
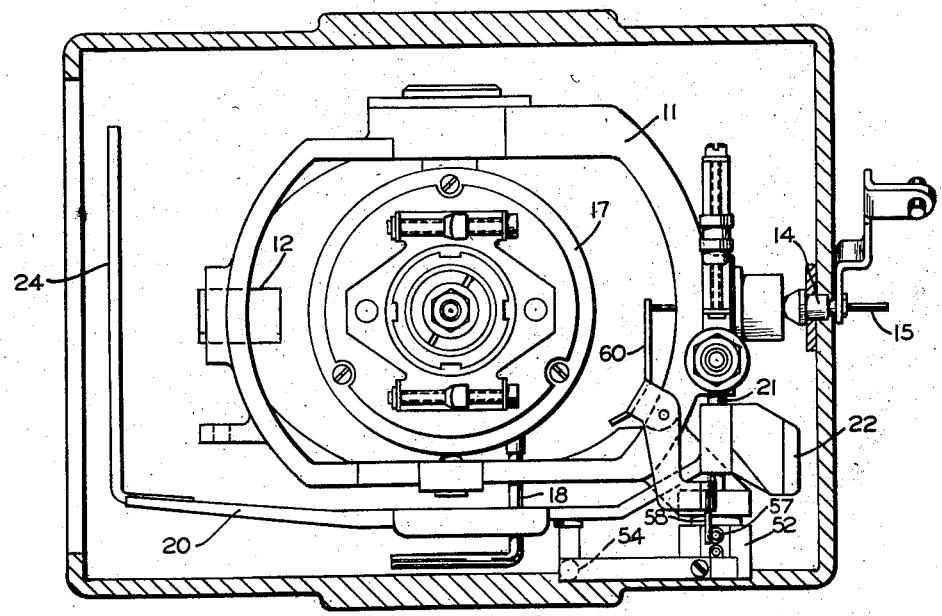
Fig. 2 is a top view of the instrument shown in Fig. 1.

Referring to Fig. 1, the gyroscope may be mounted in a suitable housing or support 10, shown merely in outline, and consists of a gimbal ring 11 pivotally mounted by means of a bracket 12 attached to the bottom of the support 10 and by means of the pivot shaft 14 extending from the side 13. As seen in Fig. 2, pivot shaft 14 is hollow so as to accommodate a rod 15 which may slide in and out for a purpose to be described later. Mounted within the gimbal ring 11, in suitable bearings so as to pivot around a second axis, is the rotor bearing casing 17.

It is well understood that within the casing 17 there is a gyro rotor which turns around a third axis and serves as an artificial horizon or plane with respect to which the gimbal ring and the rotor bearing casing pivot so as to indicate motions of the support 10 in space.

Attached to the rotor bearing casing 17 is a pin 18 which extends into a slot 19 of an arm 20 pivoted over a suitable stud 21 extending from the ring 11 and balanced by a counterweight 22. The arm 20 is generally known as a horizon bar giving indications of the tilting of the rotor bearing casing 17 and for this purpose is equipped with a pointer 24 arranged in front of the gyroscope housing so as to be visible.

The above described component elements refer in a general way to a conventional gyroscope structure to which, in accordance with the invention, certain sensing or contact elements are attached, as hereinbelow described.

Figure 3:
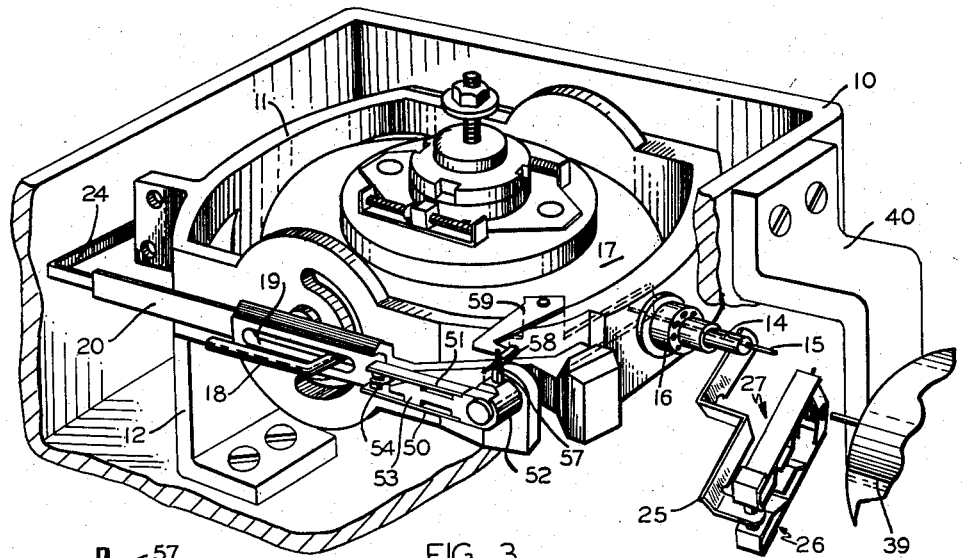
Fig. 3 is a partial view in perspective of the gyroscopic structure showing the attachment of the electrical contact elements.

Referring to the figures, and Fig. 3 in particular, it is seen that extending from the bearing 16 is the pivot shaft 14 which rotates upon displacement of the gimbal ring 11. Attached to the pivot shaft 14 is an offset contact finger 25 which cooperates with contact elements 26 and 27. The contact assembly is particularly illustrated in Fig. 5 and consists of a pair of pincer-like, juxtaposed, pivoted arms, each consisting of an outer plate member 28, an intermediate plate member 29 of resilient material which carries the contact 30, and an inner plate member 31, insulated from, but firmly attached to each other by means of insulating rivets 32 and opening to accommodate a stud or shaft around which the arms may pivot. A coil spring 36 is so arranged between both arms as to urge them toward each other. The inner member 31 also has an offset portion 37 which acts as an abutment for the purpose which will be clearly understood in reference to Fig. 6.

Figure 5:
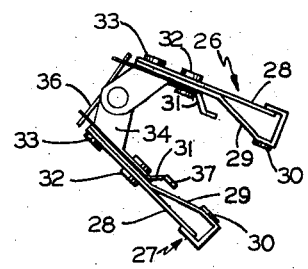
Fig. 5 illustrates the particular construction of a pair of contact elements.
Figure 6:
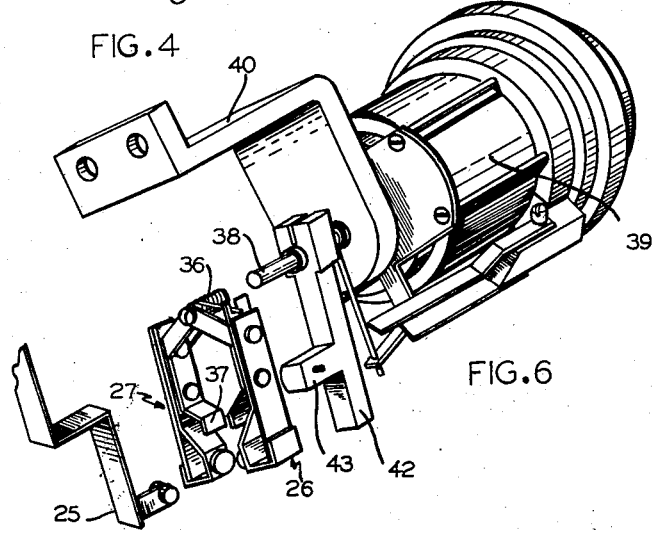
Fig. 6 is an exploded view showing the arrangement of one pair of contact elements and the follow-up mechanism therefor.

Fig. 6, in exploded view, shows the mounting of the contact pair of Fig. 5. A shaft 38 extends from a suitable rotary motion transmitting apparatus, such as a motor 39, held in a bracket 40 which is attached to the housing 10. Affixed to the shaft 38 is the bar 42, having an inwardly extending leg 43 which cooperates with the abutments 37 when the contact pair is mounted on the shaft 38.

It is seen that while each individual arm of the contact pair may freely rotate in the direction away from the leg 43 of the bar 42, the latter holds the other arm stationary. In other words, when the contact finger 25 engages the arm 27, the latter may freely pivot over the shaft 38 against the pressure of spring 36, whereas the arm 26 is held by the leg 43 against similar movement. However, upon rotation of the shaft 38, the bar 42 may move both contact elements 26 and 27 in unison in either direction. Thus, the purpose of this movement is to provide a follow-up for the contact pair which will be explained later.

The above described contact arrangement is for the purpose of closing an electric circuit upon axial displacement of the gimbal ring 11 and would, in most cases in aircraft application, be used for sensing roll axis displacement of the craft. Another contact pair consisting of the contact elements 50 and 51 is mounted upon an insulating bushing 62 having a contact support extension 53 and cooperates with a contact finger 54 attached to the horizon bar 20.

Figure 4:
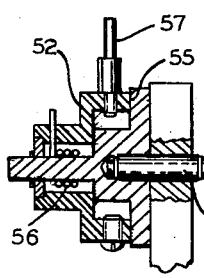
Fig. 4 is an enlarged cross-sectional view of the bushing upon which the electric contact elements are mounted.

The bushing 52, as seen in Fig. 4, is so constructed as to rotate around a bearing member 55 attached to the stud 21 around which the horizon bar 20 pivots. The bushing 52 is biased by the spring 56 urging it in a counterclockwise direction. A pin 57 extending from the bushing 52 cooperates with a pin 58 of the motion transfer arm 59. The latter serves the purpose of applying follow-up movement of the contact elements 50 and 51 and has a plate member 60 which engages the rod 15 extending from the pivot shaft 14. In normal position of the rod 15, the pin 57 of the bushing 53 abutting against the pin 58 of the arm 59 holds the contact finger 54 midway between contact elements 50 and 51, the horizon bar 20 being in mid position. Any movement of the rotor bearing casing 17 transmits motion to the horizon bar by means of the pin 18 extending through the slot 19 whereby either contact element 50 or 51 is engaged by the contact finger 54. Means (not shown here), for sliding the rod 15 inwardly or outwardly from the gyro, thereby rotating the bushing 52, will effect a follow-up inasmuch as both contacts 50 and 51 are thus moved in unison.

As seen from the above description of the apparatus, any change in the axial displacement of the gimbal ring 11 will actuate one or the other of the contact elements 26 or 27, whereas any change in the axial displacement of the rotor bearing casing 17 will actuate contact elements 50 and 51, each contact pair closing circuits in one or the other direction for sensing such displacements.

In aircraft application, the contat elements 50 and 51 cooperating with the horizon bar would indicate pitch axis displacement of the craft, whereas engagement of contacts 26 and 27 with the contact finger 25 would indicate roll axis displacement of the craft. In order to eliminate or overcome the tendency of hunting, it is a well-known practice to apply a feedback from the rudder or ailerons which are controlled by actuators upon closure of the above contacts. Such feedback is also termed the follow-up and is effected in a simple manner, as follows.

Referring to roll axis displacement, for the sake of simplicity, we may assume that finger 25 engages the contact element 27, the latter thereby being moved in a clockwise direction while contact element 26 is held by the bar 42. Now, upon suitable energizing of the motor 39, the contact 26 may also be positioned in a clockwise direction so as to follow up the movement of the contact 27. In a similar manner, by actuating the rod 15, either inwardly or outwardly, the contact 54 may be followed up by either the contact element 50 or 51, as the case may be.

Wide displacement of any one of the contact pairs due to the follow-up arrangement, permits large axial displacement of the gimbal ring 11 or the rotor bearing casing 17 without unduly loading these parts of the gyro.

Figure 7:
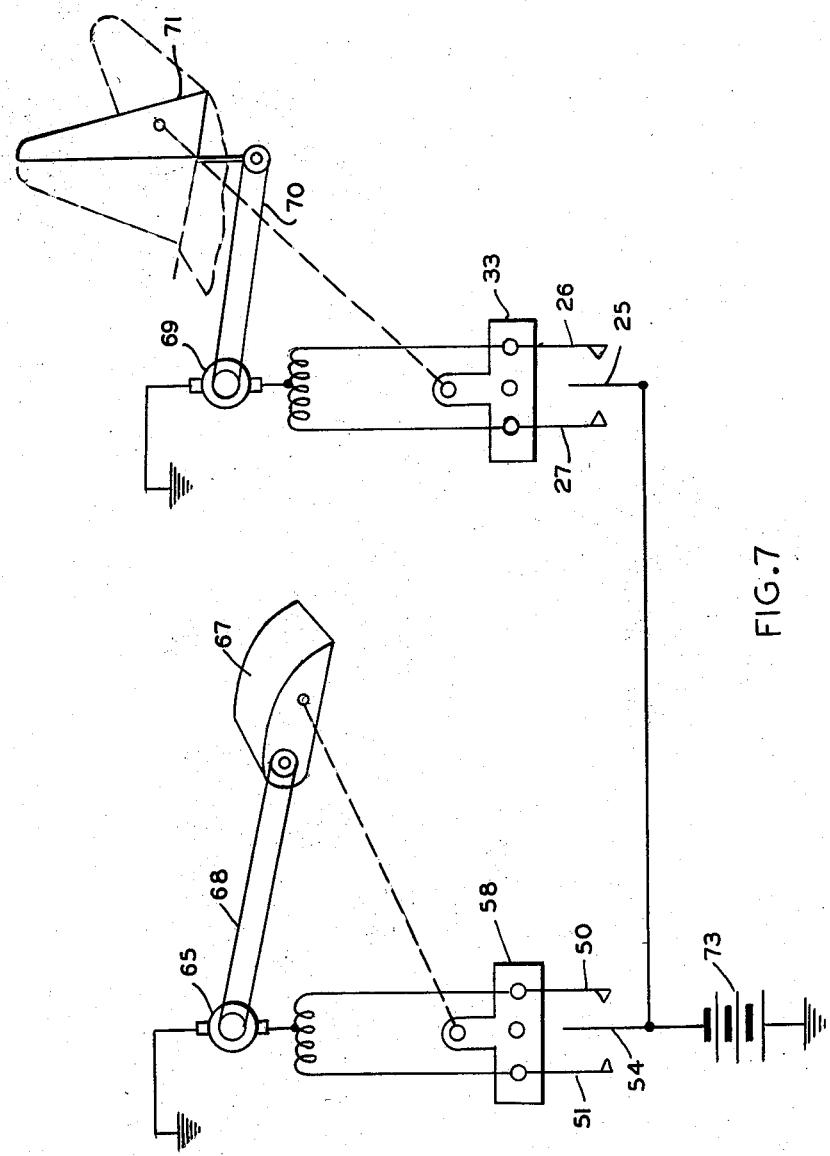
Fig. 7 is a schematic representation of the circuit connection for the gyro contacts with respect to actuation of the attitude-determining elements of a plane.

Referring to the schematic circuit shown in Fig. 7, it is seen that a reversible motor 65 is coupled to elevators 67 of the plane by the belt 68. Similarly, a reversible electric motor 69 and belt 70 are used to drive the rudder and aileron combination 71 of the plane.

A power supply indicated by the battery 73 has a common terminal connected to one side of the armature of motors 65 and 69. The other terminal of the battery 73 connects with the center contacts of the gyro, namely, contact 54 for the pitch axis displacement of the craft and contact 25 for the roll axis displacement. In the first instance, when one of the movable contacts 51 or 50 of the gyro is displaced so as to engage the contact 54, motor 65 will turn in the proper direction to counteract the cause of displacement, namely, to raise or lower the elevator so as to obtain a different altitude. The interlinkage for a follow-up is shown by the dotted line interconnecting the elevator 57 with the contact support 58 so as to pivot this in the proper direction to follow up the engaged contacts. The rudder 71 is actuated in the same manner, the interlinkage between the rudder 71 and the contact support 33 being indicated by the dotted lines.

I claim:

1. Gyroscopic apparatus comprising, in combination, a support, a gimbal ring mounted on said support for movement about a first axis, a rotor bearing casing mounted in said gimbal ring for movement about a second axis normal to said first axis, said rotor bearing casing being coupled to a pivoted lever, electrical contactors associated with said apparatus for closing circuits upon movement about said axes, comprising a first contact finger affixed to a hollow stud attached to said gimbal ring at the pivot point thereof and extending through said support, a pair of contact elements cooperating therewith, each of said contact elements being pivotally displaceable over a shaft upon engagement with said finger due to movement of said gimbal ring and follow-up means mounted on said support including said shaft for displacing both said elements simultaneously; a second contact finger attached to said lever, a second pair of contact elements cooperating therewith and mounted on said gimbal ring, each being displaceable upon engagement with said last-mentioned finger due to movement of said rotor bearing casing and follow-up means for displacing both said contact elements of said second pair in unison.

2. Gyroscopic apparatus comprising, in combination, a support, a gimbal ring mounted on said support for movement about a first axis, a rotor bearing casing mounted in said gimbal ring for movement about a second axis normal to said first axis, said rotor bearing casing being coupled to a horizon bar, electrical contactors associated with said apparatus for closing circuits upon movement about said axes, comprising a first contact finger affixed to a hollow stud attached to said gimbal ring at the pivot point thereof and extending through said support, a pair of contact elements cooperating therewith, each of said contact elements being pivotally displaceable over a shaft on said support upon engagement with said finger due to movement of said gimbal ring and follow-up means mounted on said support including said shaft for displacing both said elements simultaneously; a second contact finger attached to said horizon bar, a second pair of contact elements cooperating therewith and mounted on said gimbal ring, each being displaceable upon engagement with said last-mentioned finger due to movement of said rotor bearing casing and follow-up means for displacing both said contact elements of said second pair in unison.

3. Apparatus in accordance with claim 1 wherein said second pair of contact elements are mounted on an insulating bushing rotatably attached to said gimbal ring, spring means therewithin urging said bushing toward rotation in a counterclockwise direction, said follow-up means comprising a rod extending through said hollow stud inside said gimbal ring, a plate member facing said rod inside said gimbal ring, said plate member being attached to a transfer arm pivoted over a stud affixed to said gimbal ring, said arm having a pin, a vertically extending stud affixed to said insulating bushing and engaging said pin whereby movement of said bushing is restrained while said rod is stationary.

No references cited.